United States Patent
Johnston

(10) Patent No.: US 8,693,688 B2
(45) Date of Patent: Apr. 8, 2014

(54) ADAPTIVE PACKET CIPHERING

(75) Inventor: David Johnston, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 825 days.

(21) Appl. No.: 12/587,166

(22) Filed: Sep. 30, 2009

(65) Prior Publication Data

US 2011/0075844 A1    Mar. 31, 2011

Related U.S. Application Data

(60) Provisional application No. 61/156,882, filed on Mar. 3, 2009.

(51) Int. Cl.
*G06F 21/00* (2013.01)

(52) U.S. Cl.
USPC .......... 380/270; 713/151; 713/160; 713/168; 370/230; 370/338; 370/406; 709/223; 709/230; 709/236; 455/411; 380/46; 380/256; 380/277

(58) Field of Classification Search
USPC .................................................. 380/270, 37
See application file for complete search history.

(56) References Cited

U.S. PATENT DOCUMENTS

| | | | | |
|---|---|---|---|---|
| 6,397,259 B1 * | 5/2002 | Lincke et al. | ................ | 709/236 |
| 6,987,770 B1 * | 1/2006 | Yonge, III | ................ | 370/401 |
| 7,298,691 B1 * | 11/2007 | Yonge et al. | ................ | 370/203 |
| 7,469,297 B1 * | 12/2008 | Kostoff et al. | ................ | 709/236 |
| 7,489,629 B2 * | 2/2009 | Ye et al. | ................ | 370/230 |
| 8,483,125 B2 * | 7/2013 | Legg | ................ | 370/328 |
| 2005/0114489 A1 * | 5/2005 | Yonge et al. | ................ | 709/223 |
| 2005/0175184 A1 * | 8/2005 | Grover et al. | ................ | 380/278 |
| 2006/0136715 A1 * | 6/2006 | Han et al. | ................ | 713/151 |
| 2008/0062984 A1 | 3/2008 | Emeott et al. | | |
| 2008/0165968 A1 * | 7/2008 | Yadav et al. | ................ | 380/270 |
| 2008/0298285 A1 | 12/2008 | Ramesh et al. | | |
| 2009/0181643 A1 * | 7/2009 | Thakare | ................ | 455/411 |
| 2009/0262937 A1 * | 10/2009 | Hirth et al. | ................ | 380/256 |
| 2010/0031036 A1 * | 2/2010 | Chauncey et al. | ................ | 713/168 |
| 2011/0154029 A1 * | 6/2011 | Hahn et al. | ................ | 713/160 |
| 2012/0014366 A1 * | 1/2012 | Kim et al. | ................ | 370/338 |

FOREIGN PATENT DOCUMENTS

| | | |
|---|---|---|
| AU | 2007292527 A1 | 3/2008 |
| CN | 101335740 A | 12/2008 |
| WO | 2010/101825 A2 | 9/2010 |
| WO | 2010/101825 A3 | 11/2010 |

OTHER PUBLICATIONS

Air Interface for Broadband Wireless Access Systems|http://ieeexplore.ieee.org/stamp/stamp.jsp?tp=&arnumber=4540164|Jun. 2008|IEEE.*

(Continued)

*Primary Examiner* — Mahfuzur Rahman
(74) *Attorney, Agent, or Firm* — Thorpe North & Western LLP

(57) ABSTRACT

A method and apparatus for adaptive packet ciphering is disclosed. The apparatus can include a transceiver capable of communicating in a wireless network and specifying a packet number (PN) and an integrity check value (ICV) as separate packet data units (PDUs) in a stream of a PDUs. The data between a PN-PDU and an ICV-PDU can be enciphered as a single payload of concentrated PDUs.

12 Claims, 4 Drawing Sheets

(56) References Cited

OTHER PUBLICATIONS

An adaptive multicarrier wireless system|http://ieeexplore.ieee.org/stamp/stamp.jsp?tp=&arnumber=904646|Vogiatzis et al.|2000|pp. 298-303.*

International Preliminary Report on Patentability received for PCT Patent Application No. PCT/US2010/025762, mailed on Sep. 15, 2011, 8 pages.

Office Action received for European Patent Application No. 10749154.0, mailed on Sep. 13, 2011, 2 pages.

International Search Report and Written Opinion received for PCT Patent Application No. PCT/US2010/025762, mailed on Sep. 14, 2010, 11 pages.

Johnston, David, "Efficient Security Encapsulation for IEEE 802.16m", IEEE 802.16m-09/0491, Mar. 2, 2009, pp. 1-9.

Johnston, David, "Proposal for PDU Structure", IEEE 802.16m-09/0605, Mar. 2, 2009, 12 pages.

Office Action received for Chinese Patent Application No. 201080010173.1, mailed on Aug. 1, 2013, 17 Pages of Office Action Including 10 Pages of English Translation.

Office Action received for Korean Patent Application 10-2011-7020378, mailed on Dec. 21, 2012, 9 Pages of Office Action including 4 pages of English translation.

Barbeau,"WiMax/802.16 Threat Analysis" School of Computer Science, Carleton University, Ottawa, Ontario, Canada, Oct. 13, 2005, pp. 8-15.

* cited by examiner

ADAPTIVE PACKET CIPHERING

CROSS-REFERENCE TO RELATED APPLICATIONS

The present application claims the benefit of U.S. provisional application Ser. No. 61/156,882, filed 3 Mar. 2009, entitled "ADVANCED WIRELESS COMMUNICATION SYSTEMS AND TECHNIQUES" the entire content of which is incorporated by reference herein.

BACKGROUND INFORMATION

In wireless communication, security needs may mandate enciphering data. However, enciphering some data may require overhead due to the need to add a PN (Packet Number) and an ICV (Integrity Check Value). For example, but not by way of limitation, in the Institute for Electrical and Electronic Engineering (IEEE) 802.16e (WiMAX), the overhead is 12 bytes.

In packet communication systems, the percentage overhead is greater for small packets than for large packets. However, in systems like WiMAX where packets are fragmented, the benefits are reduced since there will be multiple crypto overheads per packet. Efficiency is very poor at, for example, cell-edge scenarios where large packets are sent in many small fragments, each with a crypto overhead.

A way to apply enciphering that is efficient for small and large bursts with small and large packets is needed.

DETAILED DESCRIPTION

Figure 1:
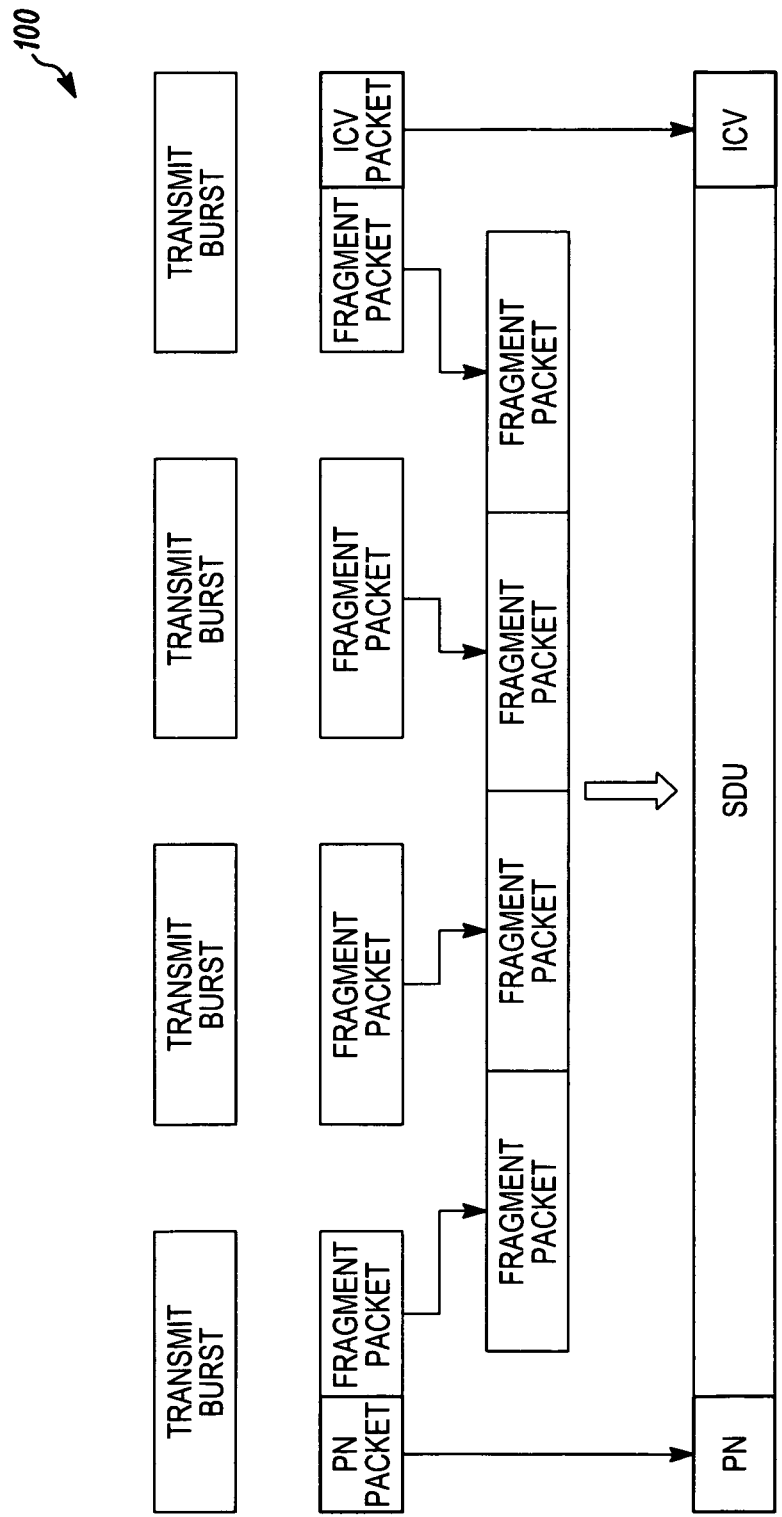
FIG. 1 illustrates PN and ICV placement for large fragment packets with small fragment sizes.

In the detailed description, numerous specific details are set forth in order to provide a thorough understanding of the embodiments of the invention. It will be understood by those skilled in the art, however, that embodiments of the invention may be practiced without these specific details. In other instances, well-known methods, procedures and techniques have not been described in detail so as not to obscure the foregoing embodiments.

Some portions of the detailed description that follows are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as processing, computing, calculating, determining, or the like, refer to the action or processes of a computer or computing system, or similar electronic computing device, that manipulate or transform data represented as physical, such as electronic, quantities within the registers or memories of the computing system into other data similarly represented as physical quantities within the memories, registers or other such information storage, transmission or display devices of the computing system.

Embodiments of the present invention may include apparatuses for performing the operations herein. This apparatus may be specially constructed for the desired purposes, or it may comprise a general purpose computing device selectively activated or reconfigured by a program stored in the device. Such a program may be stored on a storage medium, such as, but is not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), flash memory, magnetic or optical cards, or any other type of media suitable for storing electronic instructions, and capable of being coupled to a system bus for a computing device.

The processes and displays presented herein are not inherently related to any particular computing device or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

In the following description and claims, the terms coupled and connected, along with their derivatives, may be used. In particular embodiments, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

It is worthy to note that any reference in the specification to "one embodiment" or "an embodiment" means in this context that a particular feature, structure, or characteristic described in connection with the embodiment may be included in at least one embodiment of the invention. The appearances of the phrase "in one embodiment" or "an embodiment" in various places in the specification do not necessarily refer to the same embodiment, but may be referring to different embodiments.

It should be understood that embodiments of the present invention may be used in a variety of applications. Although the present invention is not limited in this respect, the circuits disclosed herein may be used in many apparatuses such as in the transmitters and receivers of a radio system. Radio systems intended to be included within the scope of the present invention include, by way of example only, wireless local area networks (WLAN) devices and wireless wide area network (WWAN) devices including wireless network interface devices and network interface cards (NICs), base stations, access points (APs), gateways, bridges, hubs, cellular radio-telephone communication systems, satellite communication systems, two-way radio communication systems, one-way pagers, two-way pagers, personal communication systems (PCS), personal computers (PCs), personal digital assistants (PDAs), and the like, although the scope of the invention is not limited in this respect.

As used herein, the term packet may include a unit of data that may be routed or transmitted between nodes or stations or across a network. As used herein, the term packet may include frames, protocol data units or other units of data. A packet may include a group of bits, which may include one or more address fields, control fields and data, for example. A data block may be any unit of data or information bits.

Figure 1A:
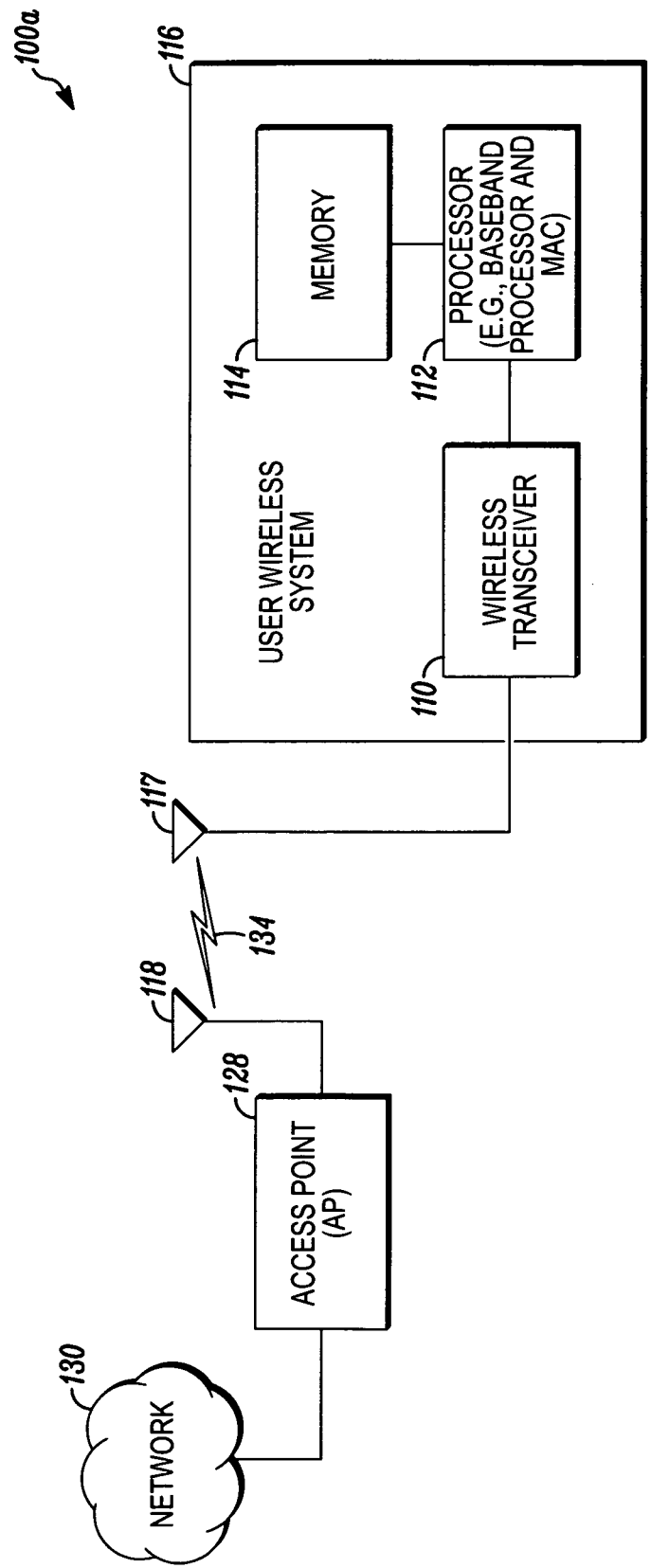

Referring to the Figures in which like numerals indicate like elements, FIG. 1a is a diagram illustrating an example of a wireless communication system in accordance with one embodiment of the invention. In the communications system 100a shown in FIG. 1a, a user wireless system 116 may include a wireless transceiver 110 coupled to an antenna 117 and to a processor 112. Processor 112 in one embodiment may comprise a single processor, or alternatively may comprise a baseband processor and an applications processor, although the scope of the invention is not limited in this respect. According to one embodiment, processor 112 may include a baseband processor and Medium Access Control (MAC).

Processor 112 may couple to a memory 114 which may include volatile memory such as DRAM, non-volatile memory such as flash memory, or alternatively may include other types of storage such as a hard disk drive, although the scope of the invention is not limited in this respect. Some portion or all of memory 114 may be included on the same integrated circuit as processor 112, or alternatively some portion or all of memory 114 may be disposed on an integrated circuit or other medium, for example a hard disk drive, that is external to the integrated circuit of processor 112, although the scope of the invention is not limited in this respect. According to one embodiment, software may be provided in memory 114 to be executed by processor 112 to allow wireless system 116 to perform a variety of tasks, some of which may be described herein.

Wireless system 116 may communicate with an access point (AP) 128 (or other wireless system) via wireless communication link 134, where access point 128 may include at least one antenna 118. Antennas 117 and 118 may each be, for example, a directional antenna or an omni directional antenna, although the invention is not limited thereto. Although not shown in FIG. 1, AP 128 may, for example, include a structure that is similar to wireless system 116, including a wireless transceiver, a processor, a memory, and software provided in memory to allow AP 128 to perform a variety of functions. In an example embodiment, wireless system 116 and AP 128 may be considered to be stations in a wireless communication system, such as a WLAN system.

Access point 128 may be coupled to network 130 so that wireless system 116 may communicate with network 130, including devices coupled to network 130, by communicating with access point 128 via wireless communication link 134. Network 130 may include a public network such as a telephone network or the Internet, or alternatively network 130 may include a private network such as an intranet, or a combination of a public and a private network, although the scope of the invention is not limited in this respect.

Communication between wireless system 116 and access point 128 may be implemented via a wireless local area network (WLAN), for example a network which may be compliant with an Institute of Electrical and Electronics Engineers (IEEE) standard such as IEEE 802.11a, IEEE 802.11b, IEEE 802.11g, IEEE 802.11n, IEEE 802.15, IEEE 802.16 and so on, although the scope of the invention is not limited in this respect.

In another embodiment, communication between wireless system 116 and access point 128 may be implemented via a cellular communication network compliant with a 3GPP or IEEE 802.16 standard, although the scope of the invention is not limited in this respect.

One or more aspects of the invention may be applied to single carrier systems where information may be transmitted over a single carrier. Alternatively, one or more aspects of the invention may be applied to multicarrier systems, such as an OFDM (Orthogonal Frequency Division Multiplexing) system for example, where information may be transmitted over multiple carriers or subcarriers, although the invention is not limited in this regard.

As stated above, previous communication crypto formats have worked over some data unit, for example, PDU or SDU or transmission burst. Embodiments of the present invention separate the crypto information from the data information, allowing the placement of PNs and ICVs, irrespective of PDU, SDU or transmission burst boundaries. The present invention provides the ability to freely specify the start and endpoint of an encipherment, free from the bounds of PDU, SDU or burst boundaries. The encoding of PNs and ICV and just another PDU, without a special PDU format. Embodiments of the present invention provide that instead of defining protocol data units (PDUs) or service data units (SDUs) formats that contain a PN (Packet Number) and an ICV (Integrity Check Value), in addition to the payload, specify the PN and ICV as separate PDUs in the stream of PDUs.

Embodiments of the present invention provide that all of the data between a PN-PDU and ICV-PDU would be enciphered as a single payload of concatenated PDUs. Since the PN and ICV are in their own PDUs and independent from the data PDUs, they can span one or more frames.

This frees the transmitter to choose the size of the field over which it encrypts, in a fashion that is efficient for the type of traffic being sent. For example, small isolated packets would get their own PN and ICV. In poor signal situations, large fragmented packets spread over multiple transmissions would share a single PN and ICV. In good signal situations, large bursts holding multiple packed PDUs would use one PN and ICV to protect the burst. Protected traffic would always be between a PN and ICV pair. Plaintext traffic (e.g., PKM management messages) would follow an ICV.

Figure 2:
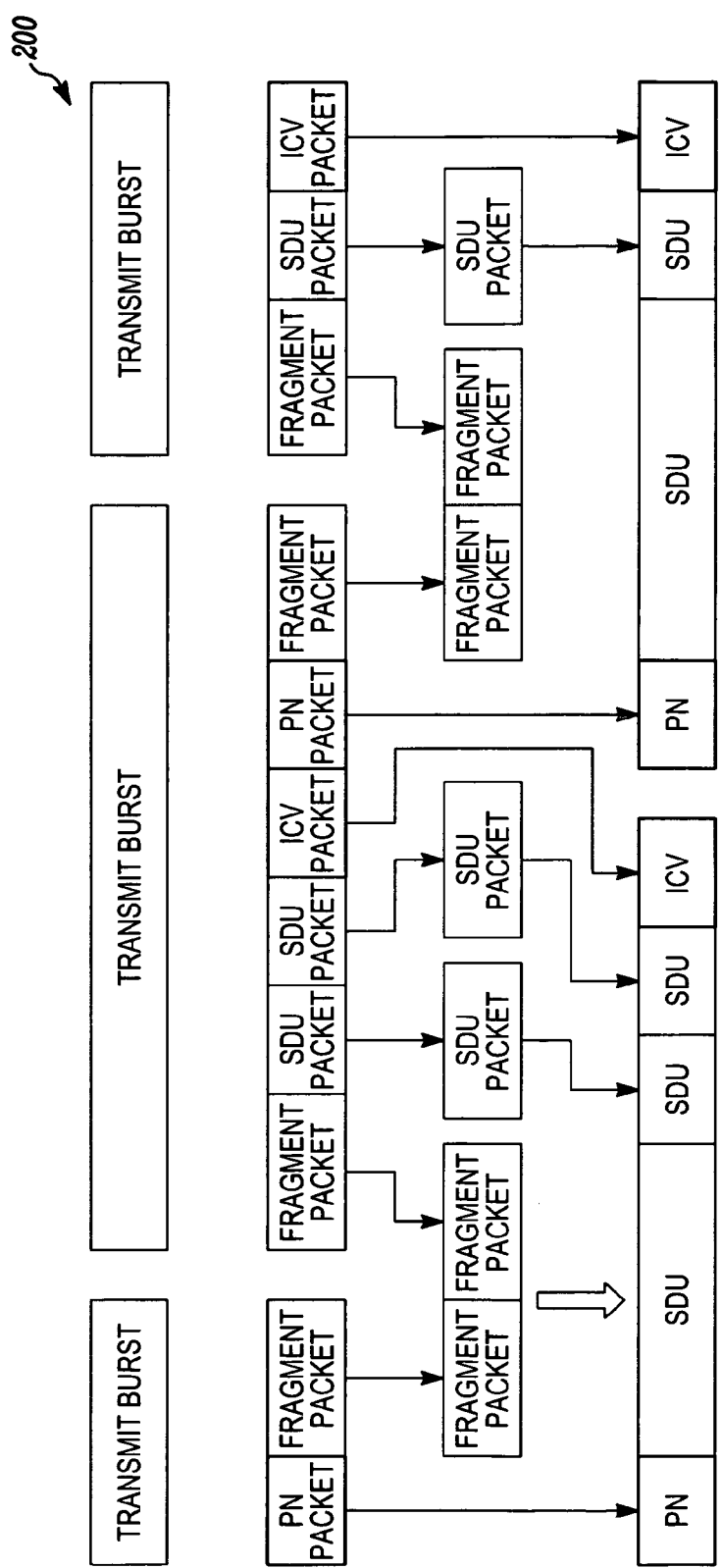
FIG. 2 shows a typical heavy data scenario, with last and first PDUs in packed bursts being fragmented according to an example embodiment.

FIG. 1, at 100, illustrates PN and ICV placement for large fragment packet with small fragment sizes in accordance with one embodiment of the invention. FIG. 2, shown generally as 200 illustrates a typical heavy data scenario, with last and first PDUs in packed bursts being fragmented according to an example embodiment. In FIG. 2, normal behavior for packed SDUs can be seen, where an ICV+PN is inserted before the final fragmented PDU. Thus all completed PDUs in the middle burst can be decrypted and delivered, while the new fragment which can't be delivered until the remaining fragments are received is decrypted following the reception of the ICV in the following burst. In this example, there is one fewer instance of PN+ICV over the case for per-burst encryption.

Figure 3:
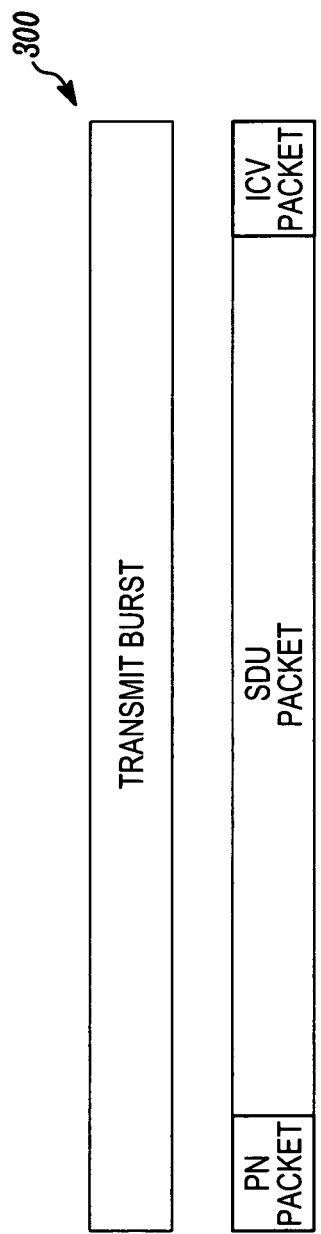
FIG. 3 is a single protected PDU according to an example embodiment.
Figure 4:
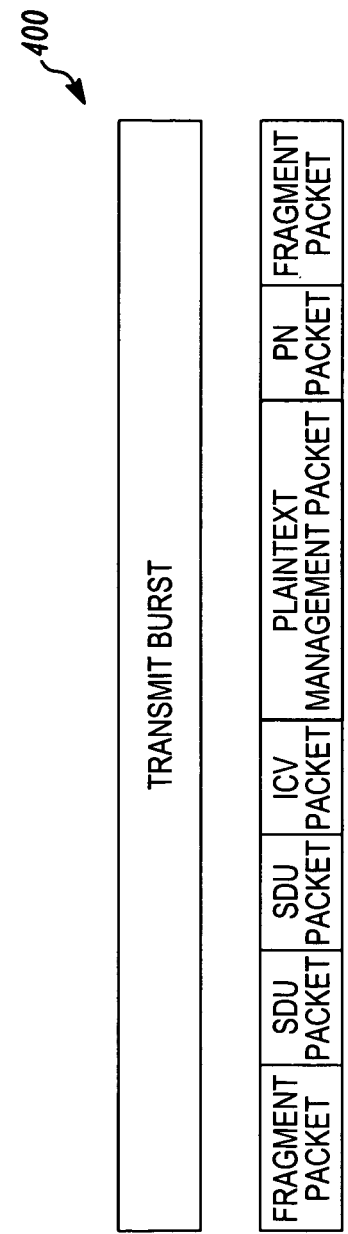
FIG. 4 shows a plaintext management packet following an ICV of embodiments of the present invention.

FIG. 3 at 300 depicts as single protected PDU according to an example embodiment. FIG. 4 at 400 shows a plaintext management packet following an ICV of embodiments of the present invention.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. An apparatus, comprising:
    a transceiver capable of communicating in a wireless network and specifying a Packet Number (PN) and an Integrity Check Value (ICV) as separate packet data units (PDUs) in a stream of PDUs, wherein said PN and ICV are capable of spanning two or more frames; and
    wherein all data between a PN-PDU and an ICV-PDU is enciphered as a single payload of concatenated PDUs, and the PN-PDU and the ICV-PDU for the single payload are configured for separate transmissions.

2. The apparatus of claim 1, whereby said transceiver is adapted to increase a number of fragmented packets encrypted with the PN and ICV under poor signal conditions, wherein the fragmented packets are spread over multiple transmissions.

3. The apparatus of claim 1, wherein protected traffic is between a PN and ICV pair and plaintext traffic follows an ICV.

4. The apparatus of claim 1, whereby said transceiver is adapted to include one PN and one ICV for a burst that includes multiple packed PDUs under good signal conditions.

5. A method of adaptive packet ciphering, comprising:
    specifying a Packet Number (PN) and an Integrity Check Value (ICV) as separate packet data units (PDUs) in a stream of PDUs,
    wherein all data between a PN-PDU and an ICV-PDU is enciphered as a single payload of concatenated PDUs;
    placing protected traffic between a PN and ICV pair and plaintext traffic follows an ICV; and
    transmitting the PN-PDU and the ICV-PDU for the single payload in separate transmissions.

6. The method of claim 5, further comprising spanning two or more frames by said PN and ICV.

7. The method of claim 5, further comprising increasing a number of fragmented packets encrypted with the PN and ICV under poor signal conditions, wherein the fragmented packets are spread over multiple transmissions.

8. The method of claim 5, further comprising including one PN and one ICV for a burst that includes multiple packed PDUs under good signal conditions.

9. A non-transitory computer readable medium encoded with computer executable instructions, which when executed, cause a machine to perform operations comprising:
    using adaptive packet ciphering and specifying a Packet Number (PN) and an Integrity Check Value (ICV) as separate packet data units (PDUs) in a stream of PDUs, wherein said PN and ICV are capable of spanning two or more frames, and wherein all data between a PN-PDU and an ICV-PDU is enciphered as a single payload of concatenated PDUs; and
    transmitting the PN-PDU and the ICV-PDU for the single payload in separate transmissions.

10. The non-transitory computer readable medium encoded with computer executable instructions of claim 9, further comprising additional instructions that increase a number of fragmented packets encrypted with the PN and ICV under poor signal conditions, wherein the fragmented packets are spread over multiple transmissions.

11. The non-transitory computer readable medium encoded with computer executable instructions of claim 9, further comprising additional instructions that provide placing protected traffic between a PN and ICV pair and plaintext traffic follows an ICV.

12. The non-transitory computer readable medium encoded with computer executable instructions of claim 9, further comprising additional instructions that include one PN and one ICV for a burst that includes multiple packed PDUs under good signal conditions.

* * * * *